June 6, 1961      M. M. HANN      2,986,896
DRIVE FOR REFRIGERATION SYSTEMS OR THE LIKE
Filed Dec. 31, 1956      2 Sheets-Sheet 1
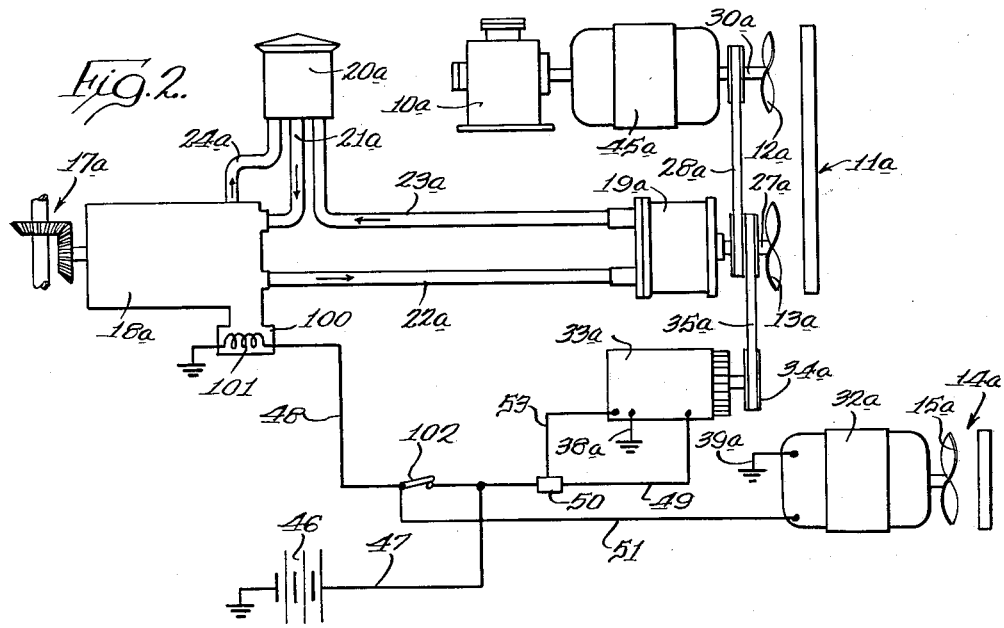
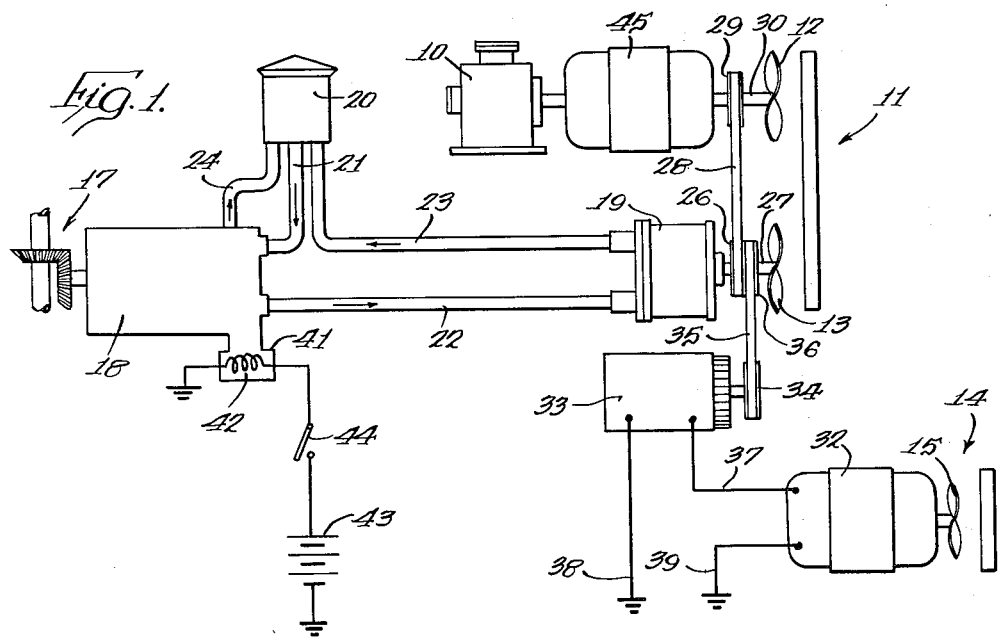
INVENTOR.
Melvin M. Hann
BY Schroeder, Hofgren,
Brady & Wegner
Att'ys.

June 6, 1961 M. M. HANN 2,986,896
DRIVE FOR REFRIGERATION SYSTEMS OR THE LIKE
Filed Dec. 31, 1956 2 Sheets-Sheet 2

INVENTOR.
Melvin M. Hann
BY Schroeder, Hofgren,
Brady & Wegner
Attys.

United States Patent Office 2,986,896
Patented June 6, 1961

2,986,896
DRIVE FOR REFRIGERATION SYSTEMS
OR THE LIKE
Melvin M. Hann, Rockford, Ill., assignor to
Sundstrand Corporation, a corporation of Illinois
Filed Dec. 31, 1956, Ser. No. 631,604
12 Claims. (Cl. 62—134)

This invention relates to drives for refrigeration systems or the like and to controls for such drives.

It is a general object of the invention to provide new and improved drives of the character described and to provide new and improved controls for such drives.

A more specific object is to provide a new and improved drive for refrigeration systems or the like including a hydraulic pump for supplying fluid under pressure to drive a hydraulic motor, and an electric generator driven by the hydraulic motor for supplying electricity to one or more electric motors for driving one or more components of the refrigeration system.

Another object is to provide a new and improved refrigeration drive of the character described including hydraulic and electric components, all of which may be mounted on the trailer section of a tractor-trailer unit, to be driven by a trailer axle.

It is also an object of the invention to provide a new and improved drive particularly adapted for use with refrigeration systems of tractor-trailer units, including a hydraulic pump on the tractor for supplying fluid under pressure to drive a hydraulic motor on the trailer, disconnectable pressure and return fluid conduits connecting the pump and motor, and means for disabling the pump when the tractor and trailer are uncoupled and the disconnectable fluid conduits are thus uncoupled also.

Another object is to provide a new and improved drive particularly adapted for refrigeration systems of tractor-trailer units including a hydraulic pump adapted to be driven by the tractor engine to supply fluid under pressure to a hydraulic motor which supplies power to drive components of the refrigeration system, and electrical control means for disabling the pump during starting of the tractor engine to avoid overloading an electric starter motor for the tractor engine.

Other objects and advantages will become readily apparent from the following detailed description taken in connection with the accompanying drawings, in which:

FIG. 1 is a diagrammatic showing of a refrigeration drive and control therefor embodying the principles of the present invention;

FIG. 2 is a diagrammatic showing of a refrigeration drive similar to that of FIG. 1, embodying a modified control;

Figure 4:
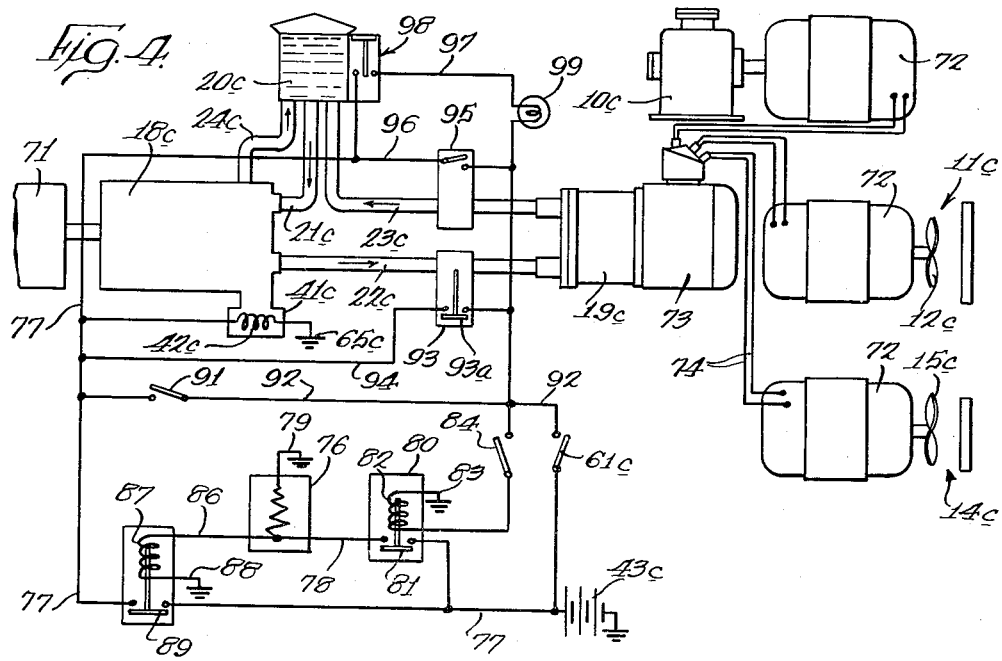
FIG. 4 is a diagrammatic showing of a further modification of a refrigeration drive and control therefor.

While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated. The scope of the invention will be pointed out in the appended claims.

This invention constitutes an improvement over the drive of my co-pending application, filed September 19, 1955, as application Serial No. 535,146, now Patent No. 2,888,810, granted June 2, 1959.

Drives according to the present invention are particularly adapted for refrigeration systems of tractor-trailer units or the like. Referring to FIG. 1, such systems may be comprised of a number of separate or combined components including a compressor 10, a condenser 11 having fans 12 and 13, and a remotely located evaporator 14 having a fan 15.

Drives of the character described may advantageously be driven from the tractor engine or from an axle, in either case through the medium of belting or gearing such as that illustrated generally at 17 in FIG. 1. Power from the tractor engine or from an axle is transmitted through the gearing 17 to drive a hydraulic pump 18. The pump 18 supplies fluid under pressure for driving a hydraulic motor 19 which in turn provides power for driving the various components of the refrigeration system. Fluid is supplied to the pump 18 from a reservoir 20 through a conduit 21 leading from the reservoir to the pump intake. Fluid under pressure is delivered from the pump discharge to the motor inlet through a conduit 22. Return fluid from the motor outlet passes to the reservoir through a conduit 23. Leakage fluid from the casing of the pump 18 is returned to the reservoir 20 through a conduit 24.

The compressor 10 is driven by means of a pulley 26 mounted on the shaft 27 of the hydraulic motor 19 and connected by a belt 28 to a pulley 29 mounted on the shaft 30 of the compressor. The condenser fan 12 is secured on the compressor shaft and the condenser fan 13 is secured on the shaft of the hydraulic motor.

In refrigeration systems of the character described, it may be desirable or necessary to locate an evaporator, such as that illustrated at 14, remotely from other components of the refrigeration systems and remotely from a drive source such as the hydraulic motor 19. In such a case, difficulty is encountered in transmitting power directly from the hydraulic motor 19 to the evaporator fan 15. As illustrated, the fan 15 is mounted on the shaft of a D.C. electric motor 32 which may easily be located with the evaporator remotely from other components. Electric power is supplied to the motor 32 by a D.C. generator 33 which is driven by the hydraulic motor 19. The generator 33 may be driven by means of a pulley 34 mounted on the shaft of the generator and connected by a belt 35 with a pulley 36 mounted on the shaft of the hydraulic motor 19. Power is supplied from the generator 33 to the motor 32 through a wire 37. The generator may be connected to ground at 38 and the motor connected to ground at 39. With an arrangement as illustrated, the generator 33 may easily be located adjacent the hydraulic motor to be driven thereby, and the electric motor 32 may be remotely located as desired, and the necessary wiring extended to connect the two.

In operation, it will be seen that when the gearing 17 is driven, as by the tractor engine or an axle, the pump 18 will thereby be driven to supply fluid under pressure for operating the hydraulic motor 19. The motor 19 is effective to drive the compressor 10 and the condenser fans 12 and 13. The motor 19 also drives the generator 33 which supplies power to drive the electric motor 32 to operate the evaporator fan 15.

The hydraulic pump 18 and the hydraulic motor 19 may, if desired, be of a construction described more in detail in my aforesaid co-pending application. Obviously, the speed at which the gearing 17 is driven may vary during operation, and variations in the speed of the gearing are effective to vary the ouptut displacement of the pump. If desired, the pump may include controls of the character described in my co-pending application to provide a constant supply of fluid to the hydraulic motor 19 in order that the latter will be operated at a constant speed.

The pump 18 is provided with a solenoid controlled valve 41, described more in detail in my co-pending application referred to. The valve 41 includes a solenoid winding 42 which is effective on energization to feather or disable the pump 18 so that even though the gearing 17 is driven, no fluid is delivered by the pump for operating the motor 19. In this manner, the components of the refrigeration system may be disabled during operation of the gearing 17.

The solenoid is connected in circuit with a battery source illustrated at 43 which may, if desired, comprise the tractor battery normally provided for purposes such as starting. A normally open switch 44 is connected in circuit with the winding 42 and with the battery and may be closed to effect energization of the winding and thereby disable the pump. The switch 44 may be a control switch of the character of any of those described in my co-pending application, or a plurality of such control switches may be provided in parallel circuits. For example, a control switch may be associated with the door to the refrigeration compartment in a manner such that the switch is closed when the door is opened, or there may be provided a thermostatically controlled switch which is closed when the refrigeration compartment is no longer in need of refrigeration. Alternatively, or additionally, a manually operable control switch may be provided if desired.

The components of the refrigeration system described are normally driven through the medium of the gearing 17. When, however, the tractor is not in operation, which may occur for a number of reasons, the refrigeration components may be driven by means of an auxiliary A.C. electric motor 45. The shaft 30 of the compressor 10 may be common to the compressor and to the electric motor 45, or the compressor and motor may have separate shafts operatively coupled together. The motor 45 is thereby connected to drive the condenser fans 12 and 13, the D.C. generator 33, as well as the compressor 10. When the hydraulic motor 19 is driven to operate the components of the refrigeration system, the electric motor 45 free wheels. When the electric motor 45 is driven, the hydraulic motor 19 free wheels. The motor 45 may be supplied with power from a suitable source convenient to the place where the tractor-trailer unit is stored.

As explained in connection with the description of FIG. 1, the battery source 43 may comprise the battery conventionally provided on the tractor for purposes such as starting, and may be maintained in a charged state by the generator conventionally provided for such purposes. In drives which utilize the tractor battery for controlling the pump solenoid 41, the pump 18 may desirably be mounted on the tractor, and the gearing 17 driven from the tractor engine or from an axle.

In FIG. 2, I have illustrated a refrigeration drive in which all of the elements may be mounted on the trailer section rather than having some or all of the parts mounted on the tractor section. The drive illustrated in FIG. 2 differs from that illustrated in FIG. 1 principally in the electric circuits provided, and parts of the drive in FIG. 2 which are the same as parts illustrated in FIG. 1 have been given the same reference numerals with the suffix "a" added.

In the drive of FIG. 2, having the hydraulic pump 18a mounted on the trailer, the pump may be driven through gearing 17a from a trailer axle. Operation of the pump 18a may be controlled by a pump solenoid 100 having a winding 101 which is normally maintained energized and which is deenergized to disable the pump. A separate battery source 46 is provided on the trailer. The battery 46 is connected by a wire 47 to a control switch means 102, and a wire 48 to the winding 101 to control energization of the pump solenoid. The control switch means 102 is normally maintained closed to normally maintain the winding 101 energized. The switch means 102 may be subject to opening by any of the means described in connection with FIG. 1 for effecting closure of the control switch means 44.

The generator 33a, which is driven by the hydraulic motor 19a, is utilized to supply power for operating the electric motor 32a, and is also utilized to maintain the battery 46 in a charged state. To this end, the armature winding of the generator 33a may be connected by a wire 49 and a voltage regulator 50 to the wire 47 so that the generator output is utilized to charge the battery 46. Power is supplied from the generator 33a to the motor 32a through the wire 49, the control switch means 102 and a wire 51 which is connected to the motor 32a and to the wire 48 between the switch 102 and the winding 101. The voltage regulator 50 is connected by a wire 53 to the field winding of the generator to regulate the generator output.

In operation of the circuit illustrated in FIG. 2, the switch 102 being normally closed functions to normally maintain the winding 101 energized. When the switch 102 is opened as described, the circuit to the winding 101 is broken, the winding is deenergized, and the pump 18a is disabled. At the same time, the circuit from the generator 33a to the motor 32a is also broken to deenergize the motor 32a. Also, when the switch 102 is opened, the circuit from the battery 46 to the motor 32a is opened, so that there is no drain on the battery by the motor when the generator is not driven.

Figure 3:
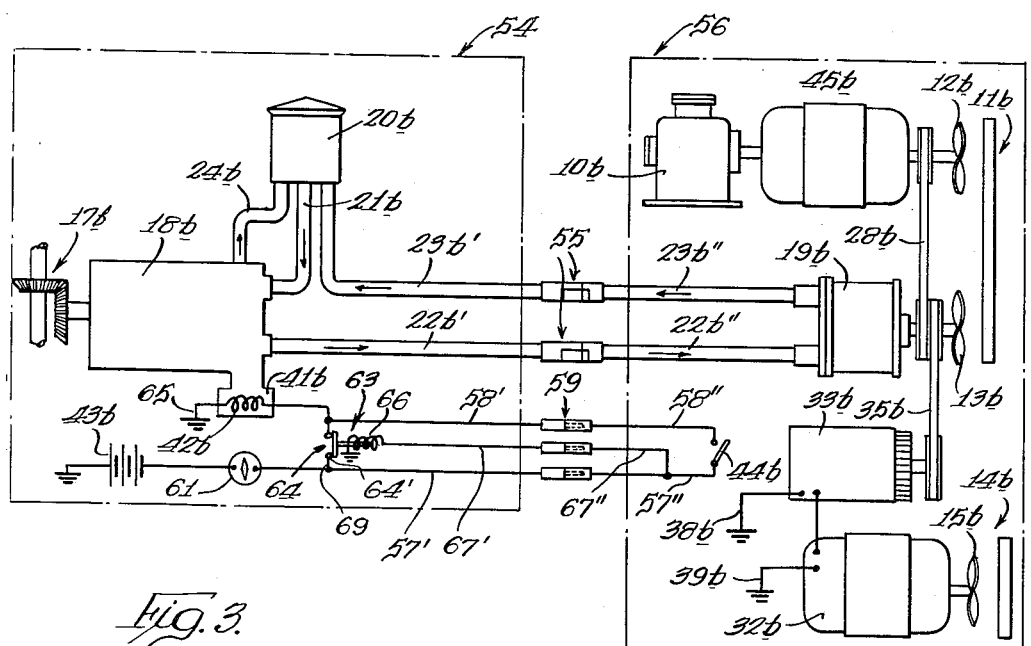
FIG. 3 is a diagrammatic showing of a modified refrigeration drive and control therefor.

The drive of FIG. 3 is also somewhat similar to the drive of FIG. 1, and parts in this figure which are the same as parts in FIG. 1 have been given similar reference numerals but use the suffix "b."

In the drive of FIG. 3, the hydraulic pump 18b and the reservoir 20b are mounted on the tractor illustrated generally at 54. The hydraulic motor 19b, the compressor, the condenser, the evaporator, and the auxiliary motor 45b are all mounted on the trailer indicated generally at 56. The tractor battery 43b conventionally provided is utilized, as in FIG. 1, to supply power for energizing the pump solenoid 42b to disable the pump. The normally open control switch means 44b is provided on the trailer. The circuit for controlling energization of the pump solenoid differs from that illustrated in FIG. 1.

As is well known, tractor-trailer units of the character described are constructed so that the tractor and trailer may be uncoupled whenever desired, and this is frequently done. Accordingly, the high pressure and return fluid lines connecting the hydraulic pump 18b and the hydraulic motor 19b are also constructed so that they may be readily uncoupled when the tractor and trailer are uncoupled. To this end, the high pressure fluid line connected between the pump discharge and the motor inlet is comprised of two parts. A first portion 22b' leads from the pump discharge on the tractor toward the trailer and the motor inlet, and a second portion 22b" leads from the motor inlet on the trailer toward the tractor and the pump discharge. Similarly, the return line includes a first portion 23b' connected with the reservoir 20b and leading from the tractor toward the trailer, and a second portion 23b" leads from the motor outlet on the trailer toward the tractor. The portions 22b' and 23b' are connected to the portions 22b" and 23b", respectively, by readily disconnectable self sealing couplings 55 of a conventional type. In this manner, the pressure and return fluid lines may be readily uncoupled whenever the tractor and trailer are uncoupled.

As seen in FIG. 3, the battery 43b on the tractor is connected to the control switch means 44b on the trailer by a wire including a first portion 57' and a second portion 57". The control switch means 44b is connected in turn with the pump solenoid 42b by means of a wire including a first portion 58' and a second portion 58". The wire portions 57' and 58' extend respectively from the truck battery 43b and the pump solenoid 42b on the tractor toward the trailer and are coupled respectively to the wire portions 57" and 58" on the trailer by readily disconnectable couplings 59 of a conventional type. Thus, it will be seen that when the tractor and trailer are coupled and the wires 57 and 58 are coupled, a circuit may be completed through the control switch means from the battery 43b to energize the pump solenoid 42b.

The hydraulic pump 18b can only be operated when the belting or gearing 17b is driven, and this can only occur when the tractor engine is operating in the case where the gearing 17b is driven by the engine. In order to avoid energization of the solenoid 42b and drain on the battery 43b in case the control switch means 44b should be closed at a time when the pump 18b is not driven, the wire portion 57' includes a normally open master switch 61 which may form a portion of the key operated ignition switch conventionally provided on the tractor. Thus, whenever the ignition for the tractor is on to permit operation of the tractor engine, the switch 61 is closed to permit operation of the pump solenoid 42b under control of the switch means 44b, and whenever the ignition for the tractor is off, the circuit to the pump solenoid is also deenergized.

Obviously, when the tractor and trailer are disconnected, the tractor engine may still be operated and the pump 18b thereby driven. In order to avoid pumping hydraulic fluid at a time when the tractor and trailer are uncoupled and the fluid lines 22 and 23 thus uncoupled, the circuit controlling the solenoid 42b includes means for energizing the solenoid if the tractor ignition is turned on when the fluid lines are uncoupled. As illustrated, the means referred to includes a relay 63 having normally closed switch contacts 64 connected across the wires 57' and 58'. Thus, whenever the wires 57 and 58 are uncoupled, and the ignition switch 61 is closed, a circuit is completed from the battery 43b through the switch contacts 64 and the solenoid 42b to a ground 65 to energize the solenoid. The pump is thus disabled or feathered and no fluid can be pumped.

In order to insure that the switch contacts 64 are opened whenever the tractor and trailer, the fluid lines, and the wires 57 and 58 are all coupled, so that energization of the pump solenoid is controlled by the switch means 44b, the coil 66 of the relay 63 has one terminal connected to ground and the other connected to a wire lead portion 67' extending from the tractor toward the trailer. The wire portion 67' is connected to a wire portion 67" by a disconnectable coupling 59. The wire portion 67" is connected with the wire portion 57" on the trailer to complete a circuit to the relay coil 66 whenever the wires are coupled and the ignition switch 61 is closed. In this manner, the switch contacts 64 are opened and energization of the pump solenoid 42b is controlled by the switch means 44b.

It will be appreciated that the circuits for controlling energization of the solenoid 42b are only illustrative, and that other circuits may be provided within the scope of the invention. For example, in lieu of the three-wire system illustrated in FIG. 3, a two-wire system may be provided. The two-wire system may be provided in the following manner, for example. The ground 65 may be dispensed with, the wire 69 leading from the wire portion 57' to the switch contact 64a may be instead connected to the ground terminal of the solenoid 42, and the switch contact 64' grounded. To complete the two-wire system, the wire portions 67' and 67" may be eliminated and the relay winding 66 placed in series in the wire portion 57', and the wire portion 57" grounded.

The drive illustrated in FIG. 4 is particularly adapted for use with a tractor-trailer unit in which the hydraulic pump is driven by the prime mover for the tractor, such as the engine illustrated at 71. Parts in the drive of FIG. 4 which are the same as parts in other drives illustrated bear the same reference numerals with the suffix "c." The compressor 10c, the condenser fan 12c, and the evaporator fan 15c are all arranged to be driven separately by separate A.C. electric motors 72. The motors 72 are supplied with power by means of an alternator 73 connected to be driven by the hydraulic motor 19c. Since no mechanical connections are required between the hydraulic motor 19c and the components of the refrigeration system, the components may each be situated remotely from the other in a manner to best accommodate the mounting of the components on the trailer. Power is supplied from the alternator 73 to the motors 72 by means such as the conductors illustrated at 74.

In drives of the character illustrated in FIG. 4, wherein the hydraulic pump 18c is driven directly from the tractor engine, it will be appreciated that the pump 18c is driven at any time when the engine is operated, and thus imposes a load on the engine. In order to avoid overloading an electric starter motor for the tractor engine during the time when the engine is being started, the circuits illustrated in FIG. 4 for controlling energization of the pump solenoid 42c, are particularly adapted for simultaneously energizing the pump solenoid with energization of the starter motor.

Additionally, the circuits illustrated in FIG. 4 for controlling energization of the pump solenoid 42c include a number of controls for energizing the solenoid during operation of the tractor engine at a time when the starter motor is not being utilized.

As illustrated, the tractor battery 43c conventionally provided may be utilized as a source of power for energizing a starter motor 76 for the tractor engine and for energizing the pump solenoid 42c. The starter motor 76 is connected in series circuit with the battery 43c by means of a wire 77 and a wire 78, and connected to ground as illustrated at 79. Energization of the starter motor is controlled by a starter solenoid 80 having normally open switch contacts 81 in the wire 78. The starter solenoid 80 includes a winding 82 connected to ground at 83 and connected in series circuit with the battery 43c through a starter switch 84 and the conventionally provided ignition switch 61c. When the switch 61c is closed and the tractor ignition thus turned on, the starter switch 84 may be closed to thereby effect energization of the starter solenoid 80. Energization of the solenoid 80 effects closure of the contacts 81 to complete a circuit through the wire 78 to energize the starter motor 76.

In order to simultaneously energize the pump solenoid 42c, the starter motor circuit includes a wire 86 in parallel with the starter motor and connected to one terminal of a relay coil 87 having its other terminal connected to ground at 88. The relay coil 87 controls normally open contacts 89 in the wire 77 leading to the pump solenoid. Thus, on energization of the starter motor 76, the contacts 89 are closed and the pump solenoid is energized to disable the pump during operation of the starter motor and thereby relieves the starter motor of excessive loads created by the hydraulic pump 18c.

After the tractor engine 71 is started, the starter switch 84 is opened to deenergize the starter motor, and simultaneously open the relay controlled contacts 89. Thus, the pump solenoid can no longer be energized through the contacts 89.

The ignition switch 61c, however, normally remains closed during operation of the tractor engine. In order to control energization of the pump solenoid 42c during operation of the tractor engine, the drive of FIG. 4 includes a number of control switches each connected in parallel with each other, and connected in series circuit with the battery 43c, the ignition switch 61c and the pump solenoid 42c.

The first of such additional control switches includes a manually operable switch 91 in a wire 92 leading from the ignition switch 61 to the wire 77 and thus connected in circuit with the solenoid 42. The switch 91 may be conveniently located on the tractor dashboard to permit energization of the pump solenoid to disable the pump whenever desired.

The remaining control switches are each responsive to a hydraulic fluid condition. The first of these includes a switch 93 in a wire 94 which is connected across the wires 92 and 77. The switch 93 may be of conventional construction and includes normally open contacts 93a which are responsive to pressure in the high pressure discharge line 22c connected with the pump discharge so as to be closed in response to an abnormal high pressure surge in the pressure line 22c. If desired, the switch 93 may be of a detent type that must be manually reset to an open position after once having been closed.

A switch 95 is provided in a line 96 connected across the wires 92 and 77. The switch 95 may be of a conventional construction, normally maintained in an open position and responsive to the temperature, either high or low, of oil in the return line 23c so as to be closed when the temperature of oil in the return line reaches a predetermined value.

A wire 97 connected across the wires 92 and 96 includes a float-controlled switch 98 of conventional construction normally maintained in an open position and responsive to the level of hydraulic fluid in the reservoir 20c to be closed when the fluid in the reservoir reaches a predetermined minimum level. A signal lamp 99 may be included in the wire 97 to indicate the low level of fluid in the reservoir when switch 98 is closed.

It will be seen that closure of any one of the switches 91, 93, 95, or 98 will be effective to complete a circuit from the battery 43c to the pump solenoid 42c and thereby disable the pump.

It will be appreciated that control circuits of the character illustrated in FIG. 4 may also be employed with drives of the character illustrated in the other figures. Also, it will be appreciated that controls of the type illustrated in FIGS. 1 through 3 may also be utilized with drives of the type illustrated in FIG. 4, that is, wherein each of the separate components of the refrigeration system is driven by a separate electric motor.

I claim:

1. In a drive for refrigeration systems of tractor-trailer units or the like having a tractor engine, a hydraulic pump driven by the tractor engine, a solenoid for disabling the pump while the tractor engine is operating, an electric starter motor for starting the tractor engine, an electric power source, an electric circuit connecting the starter motor in series with the power source, a parallel electric circuit connecting the pump solenoid in series with the power source, a starter switch for effecting energization of the motor circuit, and means in the motor circuit for energizing the solenoid circuit simultaneously with energization of the motor circuit.

2. The combination as defined in claim 1, wherein said means comprises a relay having a coil connected in the motor circuit for energization simultaneously therewith, and normally open switch contacts in the solenoid circuit closed on energization of the relay coil to energize the pump solenoid during operation of the starter motor.

3. In a drive for refrigeration systems of tractor-trailer units or the like having a tractor engine, a hydraulic pump driven by the tractor engine, a solenoid for disabling the pump while the tractor engine is operating, an electric starter motor for starting the tractor engine, an electric power source, an electric circuit connecting the starter motor in series with the power source, a parallel electric circuit connecting the pump solenoid in series with the power source, a third parallel electric circuit having a starter solenoid connected in series with the power source, a normally open manually operable starter switch for closing the starter solenoid circuit to energize the starter solenoid, normally open switch contacts in the starter motor circuit closed on energization of the starter solenoid to energize the starter motor, a relay having a coil connected in the starter motor circuits for energization simultaneously therewith, and normally open switch contacts in the pump solenoid circuit closed on energization of the relay coil for energizing the pump solenoid during operation of the starter motor.

4. In a drive for refrigeration systems of tractor-trailer units or the like having a tractor engine, a hydraulic pump driven by the tractor engine, a solenoid for disabling the pump while the tractor engine is operating, an electric starter motor for starting the tractor engine, an electric power source, an electric circuit connecting the starter motor in series with the power source, a parallel electric circuit connecting the pump solenoid in series with the power source, a starter switch for effecting energization of the motor circuit, means for energizing the solenoid circuit simultaneously with energization of the motor circuit, and a third electric circuit connected in series with the power source, in parallel with the starter motor circuit, and in series with the pump solenoid, and having normally open control switch means adapted to be closed for energizing the pump solenoid when the starter motor is not energized.

5. In a drive for refrigeration systems of tractor-trailer units or the like having a tractor engine, a hydraulic motor for supplying power to drive components of the refrigeration system, a hydraulic pump driven by the tractor engine, a reservoir and piping for supplying fluid to the pump intake, a conduit connected to the pump discharge and to the motor inlet for supplying fluid under pressure to drive the motor, a return conduit connected to the motor outlet and to the reservoir for conducting return fluid from the motor, a solenoid for disabling the pump while the tractor engine is operating, an electric starter motor for starting the tractor engine, an electric power source, an electric circuit connecting the starter motor in series with the power source, a parallel electric circuit connecting the pump solenoid in series with the power source, a starter switch in the motor circuit for effecting energization of the starter motor, means for energizing the solenoid circuit simultaneously with energization of the motor circuit to disable the pump during operation of the starter motor, and a third electric circuit connected in series with the power source, in parallel with the starter motor circuit, and in series with the pump solenoid, and having normally open control switch means to be closed in response to a hydraulic fluid condition for energizing the pump solenoid when the starter motor is not energized.

6. The combination as defined in claim 5 wherein the control switch means comprises a normally open switch adapted to be closed in response to an abnormal high pressure surge in the pump discharge line for energizing the pump solenoid.

7. The combination as defined in claim 6, wherein the control switch means comprises a normally open switch adapted to be closed in response to a predetermined temperature condition of hydraulic fluid in the return line to energize the pump solenoid.

8. The combination as defined in claim 6, wherein the control switch means comprises a normally open switch controlled by the level of hydraulic fluid in said reservoir and adapted to be closed when the fluid reaches a predetermined minimum level.

9. A drive for refrigeration systems of tractor-trailer units or the like, comprising: a hydraulic circuit including a hydraulic motor for supplying power to drive components of the refrigeration system, a hydraulic pump for supplying fluid under pressure to drive the hydraulic motor, a reservoir and piping for supplying fluid to the pump intake, a conduit connecting the high pressure pump discharge and the motor inlet, and a return conduit connecting the motor outlet and the reservoir; and an electric circuit including a solenoid for disabling the pump, an electric power source, and electric wiring connecting the power source and the pump solenoid in series and having normally open control switch means responsive to a hydraulic fluid condition in the hydraulic circuit and closable thereby for energizing the pump solenoid.

10. The combination as defined in claim 9, wherein said control switch means comprises a normally open switch adapted to be closed in response to a high fluid pressure in said hydraulic circuit.

11. A drive for refrigeration systems of tractor-trailer units or the like, comprising: a hydraulic circuit including a hydraulic motor for supplying power to drive components of the refrigeration system, a hydraulic pump for supplying fluid under pressure to drive the hydraulic motor, a reservoir and piping for supplying fluid to the pump intake, a conduit connecting the high pressure pump discharge and the motor inlet, and a return conduit connecting the motor outlet and the reservoir; and an electric circuit including a solenoid for disabling the pump, an electric power source, and electric wiring connecting the power source and the pump solenoid in series and having normally open control switch means responsive to a hydraulic fluid condition in the hydraulic circuit and closable thereby for energizing the pump solenoid, said control switch means comprising a normally open switch adapted to be closed in response to a fluid temperature condition in said hydraulic circuit.

12. A drive for refrigeration systems of tractor-trailer units or the like, comprising: a hydraulic circuit including a hydraulic motor for supplying power to drive components of the refrigeration system, a hydraulic pump for supplying fluid under pressure to drive the hydraulic motor, a reservoir and piping for supplying fluid to the pump intake, a conduit connecting the high pressure pump discharge and the motor inlet, and a return conduit connecting the motor outlet and the reservoir; and an electric circuit including a solenoid for disabling the pump, an electric power source, and electric wiring connecting the power source and the pump solenoid in series and having normally open control switch means responsive to a hydraulic fluid condition in the hydraulic circuit and closable thereby for energizing the pump solenoid, said control switch means comprising a normally open switch responsive to the level of fluid in said reservoir and adapted to be closed when the fluid reaches a predetermined minimum level.

References Cited in the file of this patent

UNITED STATES PATENTS

| | | |
|---|---|---|
| 2,077,974 | Wishart | Apr. 20, 1937 |
| 2,618,932 | Taup | Nov. 25, 1952 |
| 2,654,999 | Berge | Oct. 13, 1953 |
| 2,669,098 | Buell | Feb. 16, 1954 |
| 2,699,043 | Kramer | Jan. 11, 1955 |
| 2,720,087 | Groene | Oct. 11, 1955 |
| 2,746,267 | Sellstrom | May 22, 1956 |
| 2,752,760 | Kaufman | July 3, 1956 |
| 2,753,696 | Guerra et al. | July 10, 1956 |
| 2,794,330 | Dunn | June 4, 1957 |